United States Patent [19]

Romanzi et al.

[11] 3,901,459

[45] Aug. 26, 1975

[54] SAFETY BELT RETRACTOR LOCKING DEVICE

[75] Inventors: Louis Romanzi, Milford; David S. Robinson, Jackson, both of Mich.

[73] Assignee: Irvin Industries, Inc., Greenwich, Conn.

[22] Filed: May 28, 1974

[21] Appl. No.: 473,762

[52] U.S. Cl............................. 242/107.4; 188/139
[51] Int. Cl.² ........................................ B65H 75/48
[58] Field of Search............ 242/107.4; 280/150.5; 297/386–388; 188/139

[56] References Cited
UNITED STATES PATENTS

| | | | |
|---|---|---|---|
| 3,343,765 | 9/1967 | Baker | 242/107.4 |
| 3,722,824 | 3/1973 | Hayashi | 242/107.4 |
| 3,838,831 | 10/1974 | Bell | 242/107.4 |

Primary Examiner—Leonard D. Christian
Attorney, Agent, or Firm—Ryder, McAulay, Fields, Fisher & Goldstein

[57] ABSTRACT

A vehicle acceleration sensitive locking device is disclosed for use with a conventional safety belt retractor having a shaft mounted ratchet. The locking device includes an inertial mass mounted to sense change in vehicle velocity above a level predetermined to be dangerous. The inertial mass, through a pivotal lever and interconnecting linkage, displaces a pawl to its operate position to block rotation of the ratchet and the safety belt retractor shaft and, thereby, prevent protraction of the safety belt when the change in vehicle velocity exceeds the predetermined level. The device further includes restraining means operative to restrict movement of the mass to prevent actuation of the locking device upon initial protraction and full retraction of the belt.

20 Claims, 8 Drawing Figures

SAFETY BELT RETRACTOR LOCKING DEVICE

BACKGROUND OF THE INVENTION

1. Field of the Invention

This invention relates generally to safety belt retractors and, more specifically, to a locking device for preventing protraction of a safety belt when the vehicle is undergoing a velocity change.

2. Description of the Prior Art

Most vehicles, especially automobiles, are equipped with safety belts in order to restrain a passenger in his seat when the vehicle is undergoing a substantial change in velocity, such as when the vehicle is involved in an accident. In order for the safety belt to be effective, the belt must be locked into position to prevent protraction of the belt during the vehicle velocity change. For example, if an automobile decelerates rapidly because of an impact, the passenger will be thrown forwardly due to inertia and will apply considerable force against the safety belt. Therefore, in order for the belt to be effective, it must be locked in position to prevent movement of the belt during this deceleration.

Present day retractors such as disclosed in U.S. Pat. No. 3,635,420 owned by the assignee herein, permit protraction of the belt while the passenger places the belt around himself, and upon release of the belt, the retractor draws the belt snugly against the passenger and locks the belt in that position preventing further protraction of the belt. However, there are times when it is desirable to protract the belt after it has been buckled around the passenger; for example, as when trying to remove something from your pocket such as a handkerchief, or a coin for a tollbooth, or even during shifting in the seat for comfort. Most present day retractors do not enable such protraction without unbuckling the safety belt and completely retracting the belt.

One known retractor locking device which permits protraction of the belt after it is fixed around the body of a passenger is disclosed in West German Pat. No. 143,422 (Autoflug). The locking device in Autoflug, similar to that provided for herein, includes an inertial mass mounted on a frame and disposed to sense a change in vehicle velocity above a predetermined magnitude. Movement of the inertial mass controls the movement of a pawl by means of an interconnecting lever which enables the pawl to engage with a ratchet mounted on the shaft of the locking device. Engagement of the pawl with the ratchet prevents rotation of the shaft thereby preventing protraction of the safety belt connected thereto when the change in vehicle velocity is above said predetermined amount.

In order to prevent premature engagement of the locking device, such as might occur prior to the initial protraction of the belt when the vehicle is either parked on a steep incline or undergoing a change in vehicle velocity less than a predetermined amount, Autoflug provides a restoring spring operatively associated with the mass to place some restraint upon the movement thereof. Under the aforesaid conditions, the resiliency of the spring exerts a restoring force which prevents the mass from pivoting more than a predetermined number of degrees, which limited pivotal movement is insufficient to actuate the locking device. However, use of a restoring spring in association with the mass to prevent engagement of the locking device prior to the initial protraction of the belt has not proven entirely satisfactory. In this regard, use of the device subjects the spring to constant wear such that it has to be periodically replaced which is a time-consuming operation that often requires that the vehicle be taken out of service to complete the repair operation.

The present invention conveniently permits continual protraction and/or retraction of the belt after it is positioned around the passenger and during the entire period that the vehicle undergoes changes in the velocity less than a predetermined dangerous amount. The passenger is thus afforded freedom of movement without having to unbuckle the belt and completely retract the same. The structure is such, however, to also prevent protraction of the belt when the vehicle undergoes a velocity change in excess of the said predetermined amount to restrain the passenger in his seat.

The invention further provides novel restraining means to restrict movement of the mass to prevent actuation of the locking device upon initial protraction and full retraction of the belt. The restraining means is operative regardless of whether the vehicle is parked on a steep incline or is undergoing changes in vehicle velocity, and does not rely on any restoring spring or other resilient member in association with the mass to restrict movement thereof.

It is understood that where the term "change in velocity" is used throughout the application, it is to be interpreted to mean change in velocity in a relatively short interval of time as would be encountered, for example, in a crash situation or a sudden emergency stop.

SUMMARY OF THE INVENTION

The present invention is directed to a novel safety retractor locking device intended for use with a conventional safety belt retractor of the type having a shaft rotatably mounted on a frame. The shaft includes a spool portion around which the safety belt is wrapped for protraction and retraction with respect thereto. A bias spring urges the shaft to rotate in a direction to wrap the safety belt around the spool. The retractor also includes a ratchet drivingly connected to the shaft and used to prevent protraction of the safety belt at certain predetermined times.

The locking device comprises a pivotal mass which is responsive to a change in vehicle velocity, including any change in vehicle direction. The mass is mounted so that it is moveable between a first position wherein the change in vehicle velocity is below a predetermined magnitude, and a second position wherein the change in vehicle velocity is greater than said predetermined magnitude to effect operation of the locking device.

A pawl is pivotally mounted so that it is capable of movement from an inoperable position wherein said pawl is spaced from the ratchet to an operate position wherein said pawl engages the ratchet to prevent protraction of the belt. The device further includes a gear mounted on the shaft for rotation therewith. A latch is pivotally mounted on the pawl for movement from an inoperable position wherein the latch is spaced from the gear to an operate position wherein the latch engages the gear for movement therewith. Engagement of the latch with the gear and the resulting movement of the latch serves to displace the pawl to its operate ratchet engaging position.

A lever is pivotally mounted in engagement with the mass, so that it is capable of movement responsive to the position of the mass. The lever is also in engagement with the latch such that when the mass is in its second position, the latch is displaced by the lever to its operate position, which in turn, displaces the pawl to its operate ratchet engaging position to prevent further protraction of the belt. In another aspect of the invention the interengaging relation of the lever with the mass is such that after the mass has moved to its second position, the lever serves to also limit further pivotal movement of the mass beyond its second position.

The device further includes restraining means responsive to protraction and retraction of the belt, and operative to prevent movement of the mass to its second position at certain predetermined times. The restraining means comprises a cam wheel operatively driven by the gear, and a cam follower element pivotally mounted in engagement with the wheel. A lobe portion of the cam wheel displaces the cam follower toward the mass to prevent movement of said mass to its second position upon full retraction of the belt. The restraining means further comprises clutch means which engage the cam follower for maintaining said follower in its displaced position upon initial protraction of the belt. After the belt is initially protracted and fastened around the passenger and then retracted slightly to fit snugly against the passenger, the restraining means is no longer operative to prevent movement of the mass to its second position. The locking device is now ready to become engaged when the change in vehicle velocity is greater than the predetermined magnitude to prevent further protraction of the belt.

Accordingly, an object of the present invention is to provide a safety belt retractor locking device which permits protraction of the belt after it is fixed around the body of a passenger without having to unbuckle the belt, but yet prevents protraction of the belt when the change in vehicle velocity exceeds a predetermined amount.

Another object of the present invention is to provide a safety belt retractor locking device which is able to sense change in vehicle velocity in any direction and which may be mounted on conventional retractors.

A further object and feature of the present invention is to provide a safety belt retractor locking device having a restraining mechanism to prevent actuation of the locking device upon initial protraction and full retraction of the belt.

Another object, feature and advantage of the present invention is to provide a safety belt retractor locking device which is inexpensive to manufacture and install and which is highly effective.

The above and other objects, features and advantages of the present invention will become more apparent from a full consideration of the following detailed description when taken in conjunction with the accompanying drawings.

DESCRIPTION OF THE PREFERRED EMBODIMENT

Referring to the drawings, particularly FIGS. 1, 2, 7 and 8, numeral 10 represents a safety belt retractor locking device constructed in accordance with the present invention. Locking device 10 is intended to be used in combination with a conventional safety belt retractor 12 of the type illustrated in the drawings. It should be noted, however, that the retractor illustrated represents only one type of retractor mechanism suitable for use with the present locking device and is not to be deemed a limitation on the present invention or to the scope of patent coverage claimed herein.

To simplify an understanding of this invention there now follows a description of a typical conventional safety belt retractor. Retractor 12 includes a shaft 14 on which is mounted a spool 16. The spool 16 is included within a frame 18 formed with spaced apart side walls 20, 22 each having an aperture 24, 26 respectively. The side walls serve as a support for the shaft 14. The spool is provided with a slot (not shown) to fixedly receive one end of a safety belt 28 which is wrapped around the spool 16 and disposed for protraction and retraction with respect thereto.

One end 30 of the shaft 14 extends through the aperture 26 in the housing wall 22 and is provided with a slot 32 for receiving the inner end of a helical flat spring 34. The outer end of the spring 34 is attached to or bears against a spring closure 36 which encloses and confines the spring. Spring 34 exerts a force on shaft 14 and, therefore, on the spool 16 in the direction of belt retraction.

The other end 37 of the shaft 14 extends through the aperture 24 in side wall 20. A ratchet 40 is mounted on the shaft 14 on the inside of side wall 20 and is disposed for rotation together with the shaft.

A passenger seated in the vehicle seat and desiring to buckle the safety belt around himself protracts the safety belt 28 by pulling one end thereof until it is long enough to enable him to engage that end of the safety belt with a second half of the safety belt (not shown) in a conventional manner. During protraction of the safety belt 28 the flat coil spring 34 is wound tightly thereby applying a greater force on the shaft 14 tending to retract the safety belt. Upon release of the safety belt 28 by the passenger, the spring 34 retracts the belt until the belt 28 fits snugly around the passenger. If the passenger wants to extend the belt 28 further, he will be able to do so by merely applying a force on the belt. However, during emergency situations, there is nothing provided with the retractor 12 to prevent the belt from being protracted. This is the purpose for the locking device 10 of the present invention.

Locking device 10 comprises a pawl 42 pivotally mounted on the frame 18. Pawl 42 includes a primary portion 44 located between the walls 20 and 22 of the frame 18 and an extension 46 extending beyond wall 20 of said frame. Extension 46 includes an upwardly extending arm 48 to which is pivotally mounted a latch 50 which, in turn, has an upwardly extending projection 52 at the free end thereof. Latch projection 52 is disposed to engage with a gear member to effect movement of pawl 42 in a manner hereinafter described. The side walls 20, 22 are provided with openings to pivotally support the pawl 42 for movement from an inoperable position wherein the pawl primary portion 44 is spaced from ratchet 40 permitting free rotation of said ratchet to an operate position wherein the pawl primary portion 44 engages ratchet 40 preventing said ratchet from rotating in a direction of protraction of safety belt 28. Biasing means, such as a coil spring 54, is connected at one end to the pawl 42 and the other end to the frame 18 placing a biasing force on the pawl urging it toward its inoperable position wherein said pawl is spaced from the ratchet. A pin 56 projects outwardly from side wall 20 and is located in the path of pivotal movement of pawl arm 48 to define a stop to limit counterclockwise rotation of pawl 42 as viewed in the drawings.

A gear 58 is mounted on shaft end 38 for rotation together with shaft 14. In this regard, the outer surface of gear 58 is provided with a recess portion 60 having a slot or keyway 62. Recess 60 is adapted to receive a plug 64 having a projection or key portion 66 received within keyway 62. A bolt 68 passes through a central opening in plug 64 and threadedly engages in shaft end 38 for mounting gear 58 to shaft 14. Accordingly, rotation of shaft 14 serves to rotate gear 58 conjointly therewith. The outer surface of gear 58 is formed having a raised helical projection 70, and said gear 58 is also provided with a plurality of teeth projections 72 formed along the circumferential edge thereof. Gear 58 further includes an annular shoulder portion 74 projecting from the inner surface of gear 58 in the direction toward ratchet 40. Shoulder 74 is adapted to receive clutch means 76 thereon in the form of a slip ring 78 having a projecting lug portion 80. The structure is such that slip ring 78 is operatively connected to shaft 14 for partial rotation therewith. In this regard, the outer surface of side wall 20 includes another outwardly projecting pin 82 located in the path of rotational movement of projecting ring lug 80 to define a stop to limit clockwise rotation of slip ring 78 as viewed in the drawings. Counterclockwise rotation of slip ring 78 is limited by engagement of projecting ring lug 80 with a restraining member in a manner hereinafter described.

The central control for locking device 10 is a member which is responsive to change in vehicle velocity. Referring to the drawings, a pivotal mass 84 having an enlarged upper or head portion 86 and a depending post portion 88 seats within a bracket 90 that is mounted on a frame side wall 20 by means of screws 92. The top surface of mass head portion 86 is formed having a generally circular recess 94 including a bottom wall 96 which tapers radially outwardly and upwardly from the center thereof to define a camming surface. The bottom wall 96 terminates in side walls 98 which define a shoulder that engages with a lever hereinafter described to limit pivotal movement of the mass under certain conditions. The outer walls of post portion 88 taper inwardly from its free or base end toward the mass head portion 86. Bracket 90 is formed having an opening 100 for receiving tapered post portion 88. The structure is such that pivotal mass 84 is free to pivot about its base in any direction away from a vertical axis drawn through the post portion 88.

Since the safety belt retractor is mounted on a vehicle such that when the vehicle is in its normal horizontal position, the pivotal mass 84 is seated with its main axis vertical, it can be seen that the pivotal mass 84 will sense a change in vehicular velocity including direction in any conceivable direction that the change might occur. The mounting of inertial mass 84 on bracket 90 and the configuration of tapered post portion 88 relative to the interior wall of bracket opening 100 is such to permit the mass 84 to pivot a predetermined number of degrees (for example, 10° – 20°) when the change in vehicle velocity is less than a predetermined magnitude. This predetermined magnitude is determined to be sufficiently small as not to place passengers in the vehicle in danger of injury so that it is not necessary for the safety belt to be precluded from protraction. However, a change in vehicle velocity greater than the predetermined amount causes the mass 84 to pivot more than the minimum angle and, thereby, results in locking the safety belt against further protraction in the manner hereinafter described. Accordingly, inertial mass 84 may be considered as being disposed for movement between a first position wherein the velocity change is below a predetermined magnitude and a second position wherein the velocity change is greater than said predetermined magnitude to engage the locking device.

A lever 102 is pivotally mounted on bracket 90 and is positioned with its free end located above inertial mass 84. A contact element 104 depends from the bottom surface of lever 102 and engages with the inertial mass. In this regard, contact element 104 is formed having a rounded surface which slideably engages the bottom wall 95 in recess 94 of the mass upon movement of said mass between its first and second positions. Lever 102 may thus be considered as being displaced for movement responsive to the position of inertial mass 84. The mounting arrangement of lever 102 is also such that a bottom surface portion of latch 50 is disposed in contacting relation with a top surface portion of the lever. Accordingly, as will become apparent from reference to FIG. 5, pivotal movement of mass 84 to its second position serves to displace lever 102 upwardly which, in turn, displaces latch projection 52 in the path of movement of gear 58. Any subsequent protraction of safety belt 28 will result in counterclockwise rotation of gear 58 which serves to engage latch projection 52 with one of the gear teeth projections 72. Such engagement serves to displace latch 50 to an extent which displaces pawl 42 to its operate position, wherein said pawl engages ratchet 40 to prevent further protraction of safety belt 28.

Locking device 10 further includes restraining means 106 responsive to protraction and retraction of safety belt 28. The restraining means restrict movement of inertial mass 84 to prevent actuation of the locking device under certain conditions. Thus, restraining means 106 comprises a cam wheel 108 rotatably mounted on a bracket 110 connected to frame side wall 20 by suitable means such as screws (not shown) or the like. Cam wheel 108 includes a lobe portion 112 projecting radially outwardly beyond the edge of the wheel, and a plurality of circumferentially spaced lugs 114 projecting outwardly normal to the plane of said wheel in the direction toward gear 58. The arrangement is such that a portion of gear helical projection 70 is received between a pair of spaced cam lugs 114 and is rotatably engageable therewith whereby rotation of gear 58 serves to drive cam wheel 108 upon protraction and retraction of safety belt 28.

Restraining means 106 further comprises a cam follower 116 pivotally mounted on bracket 90 and having a free end located between lever 102 and cam wheel 108. Referring again to FIGS. 1, 2, 7 and 8, the free end of cam follower 116 is bifurcated to provide a pair of leg portions 118, 120 respectively. Leg portion 118 terminates in an upwardly projecting contact surface 122 which is disposed in engaging relation with cam wheel 108, and leg portion 120 is formed having a bottom contact surface 123 projecting downwardly in the direction toward lever 102. In this regard, bias means in the form of a spring element 124 is provided having one end engaging the bottom surface of cam follower 116 and the other end engaging bracket 90 for urging said cam follower into riding contact with the circumferential edge of cam wheel 108. The mounting of cam wheel 108 is such that upon full retraction of safety belt 28, the cam lobe 112 engages contact surface 122 to displace cam follower 116 in the direction toward inertial mass 84. This displacement results in the bottom contact surface 123 of cam follower 116 engaging the top surface of lever 102 to displace said lever against inertial mass 84.

Lever 102 is thus sandwiched between cam follower 116 and inertial mass 84 whereby displaced cam follower 116 exerts a centering force on inertial mass 84 to prevent movement of said mass to its second position upon full retraction of the safety belt. It will be appreciated that when lever 102 is displaced downwardly against inertial mass 84 under influence of displaced cam follower 116, the latch 50 is free to pivot clockwise to its inoperable position wherein latch projection 52 is spaced from gear 58.

Restraining means 106 further relates to the interengaging cooperation of clutch means 76 with a portion of cam follower 116 during initial protraction of safety belt 28. In this regard as will become apparent by reference to FIG. 8, leg portion 120 of cam follower 116 is formed having a recess surface portion 126 adapted to receive thereon the projected lug 80 of slip ring 78 to maintain cam follower 116 in its displaced position during initial protraction of the belt. The interengagement of slip ring lug 80 with displaced cam follower 116 during operation of the device is illustrated in FIG. 3.

Figure 1:
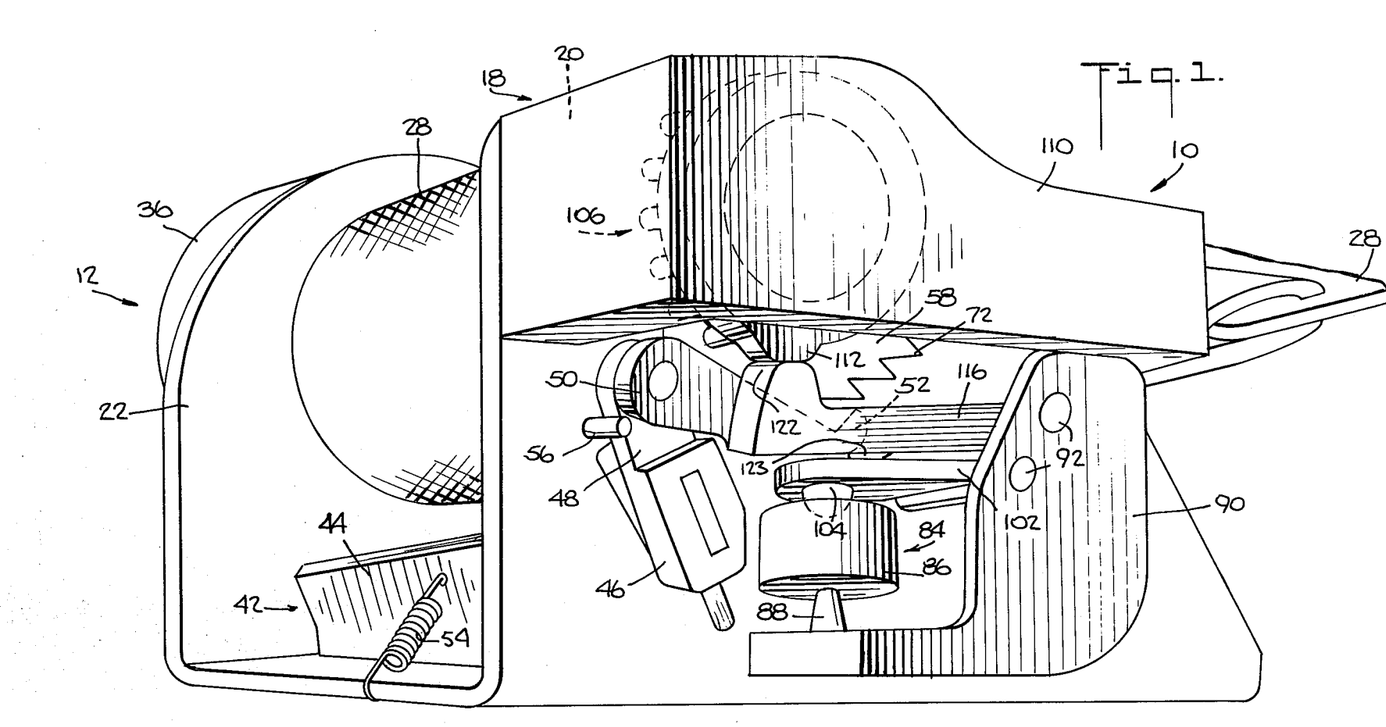
FIG. 1 is a perspective view of the safety belt retractor locking device constructed in accordance with the present invention, the locking device cover having been removed to illustrate the operative elements thereof.
Figure 2:
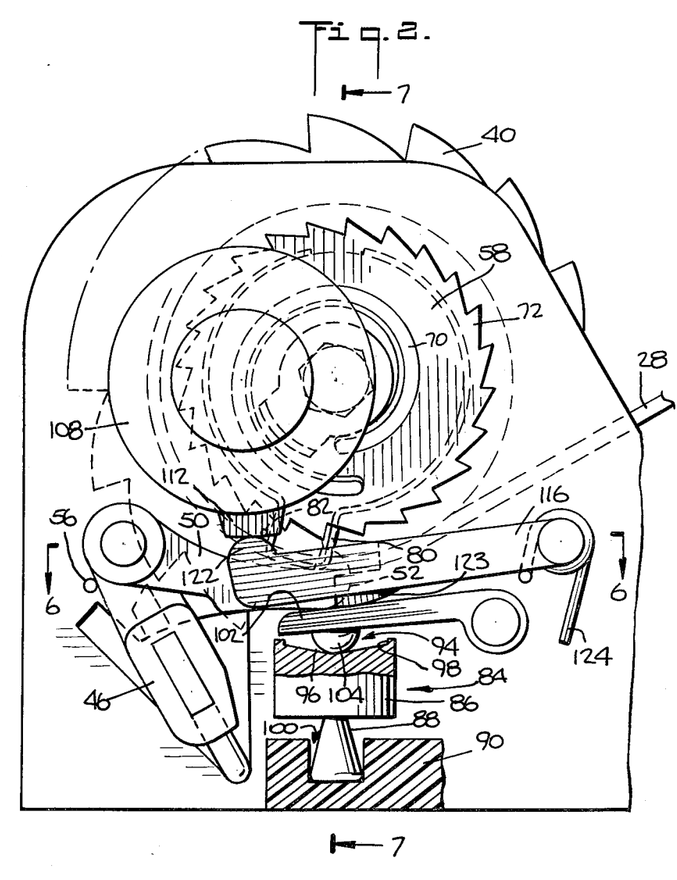
FIG. 2 is an end view of the locking device of FIG. 1 illustrating the position of the operative elements when the safety belt is in its fully retracted position.
Figure 7:
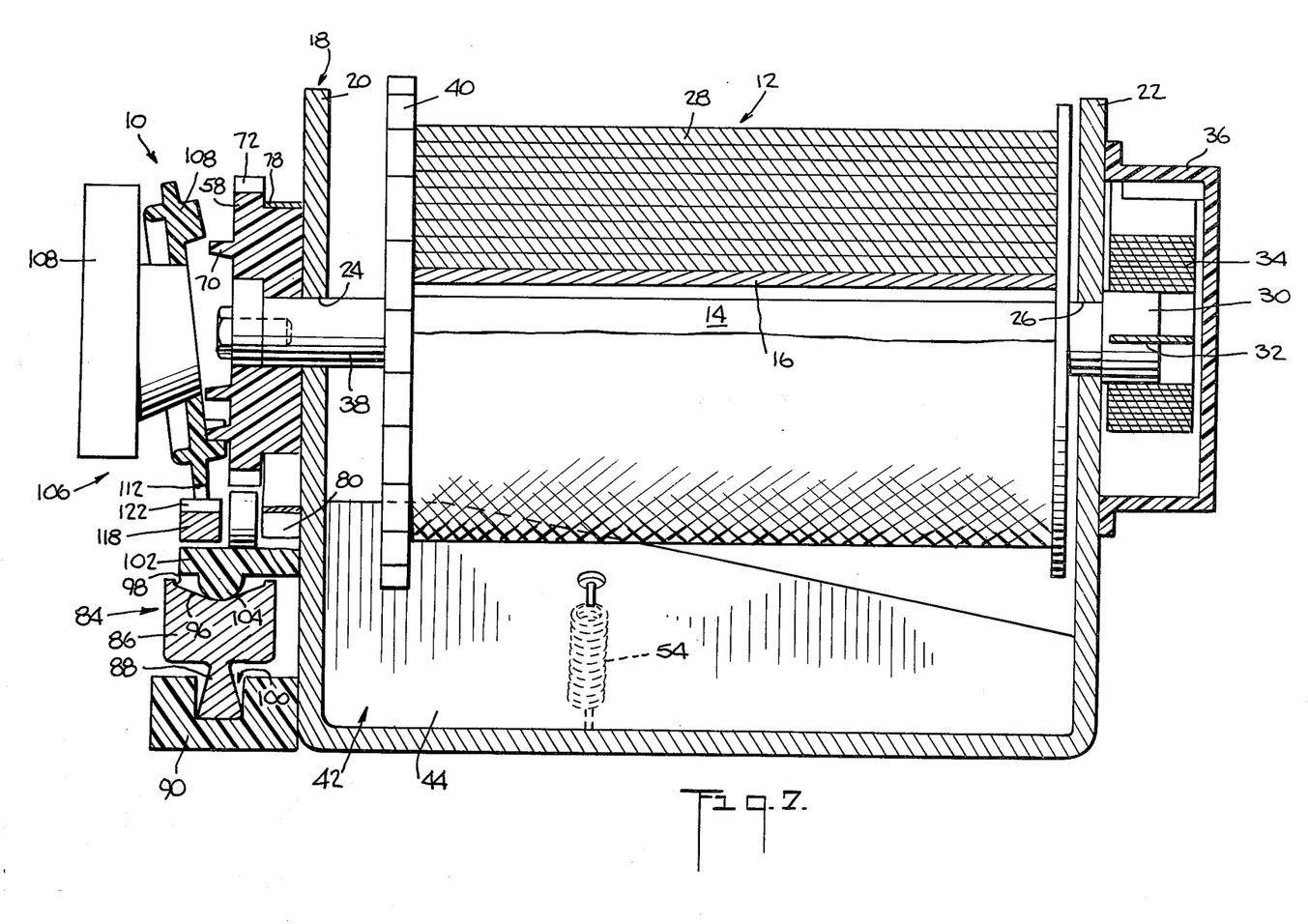
FIG. 7 is a sectional view taken along line 7—7 of FIG. 2.
Figure 8:
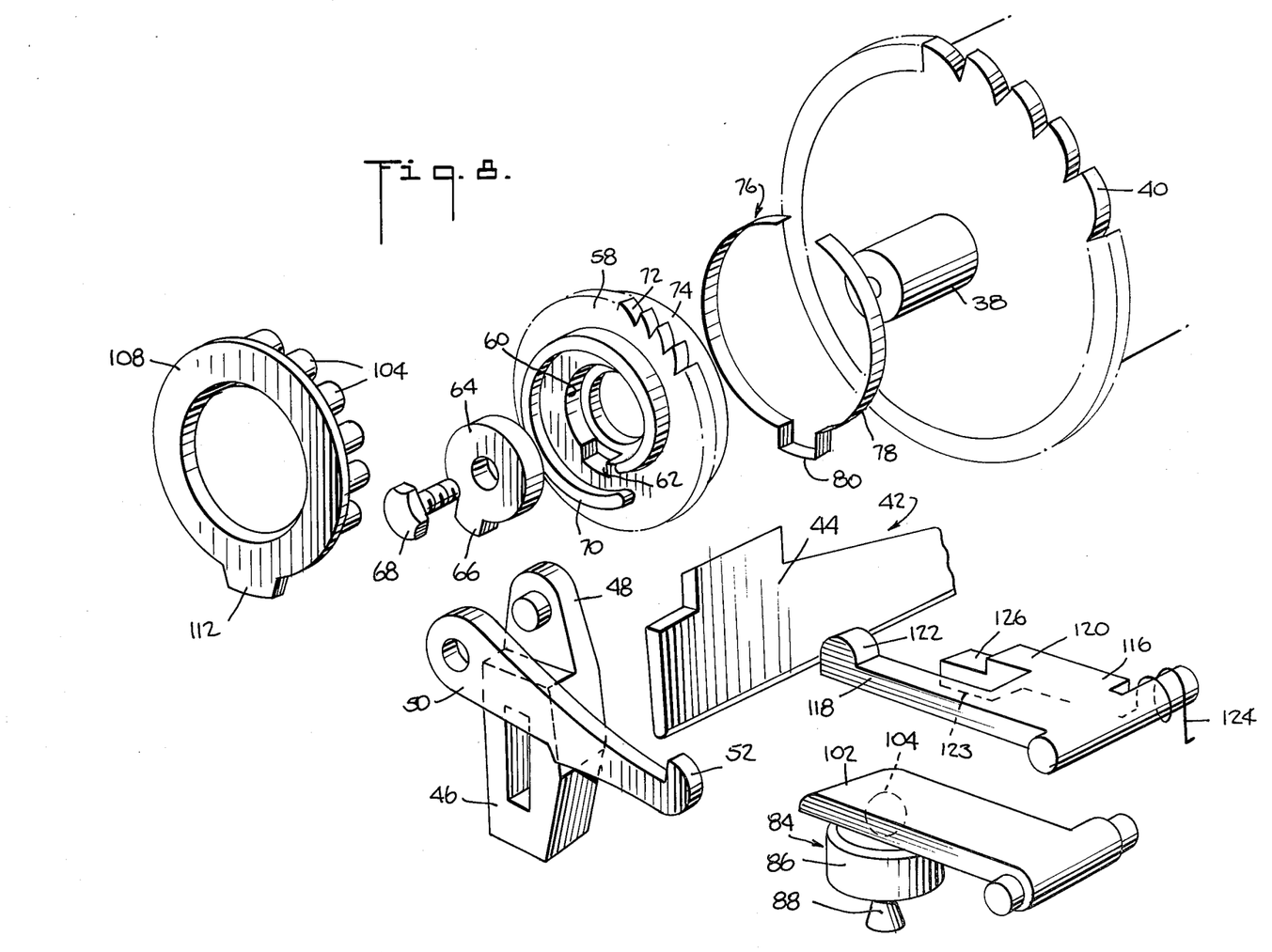
FIG. 8 is an exploded perspective view of the associated elements of the locking device.

Referring to the operation of locking device 10, FIGS. 1, 2 and 7 illustrate the position of the various elements of the device when the safety belt is in its fully retracted position. Retraction of safety belt 28 is effected by clockwise rotation of shaft 14 under influence of retractor spring 34. Such rotation of shaft 14 also serves to rotate gear 58 clockwise which, in turn, similarly rotates cam wheel 108 and slip ring 78. Clockwise rotation of slip ring 78 continues until projecting lug 80 bears against pin 82 whereupon ring 78 is free to slip relative to continued clockwise rotation of gear 58. As previously noted, upon full retraction of belt 28, cam lobe 112 is positioned in engagement with cam follower contact 122 to displace said cam follower against lever 102 to prevent movement of inertial mass 84. Thus, mass 84 is illustrated in said figures in its heretofore designated first position. The position of the elements in FIGS. 1, 2 and 7 is such that latch 50 is spaced from gear 58 and pawl 42 is spaced from ratchet 40, which positions represent the heretofore designated inoperable positions of said elements. Accordingly, it is to be noted that restraining means 106 is automatically rendered operative to prevent movement of inertial mass 84 to its second position whenever safety belt 28 is in its fully retracted position, regardless of whether the vehicle is parked on a steep incline or is undergoing changes in vehicle velocity.

Figure 3:
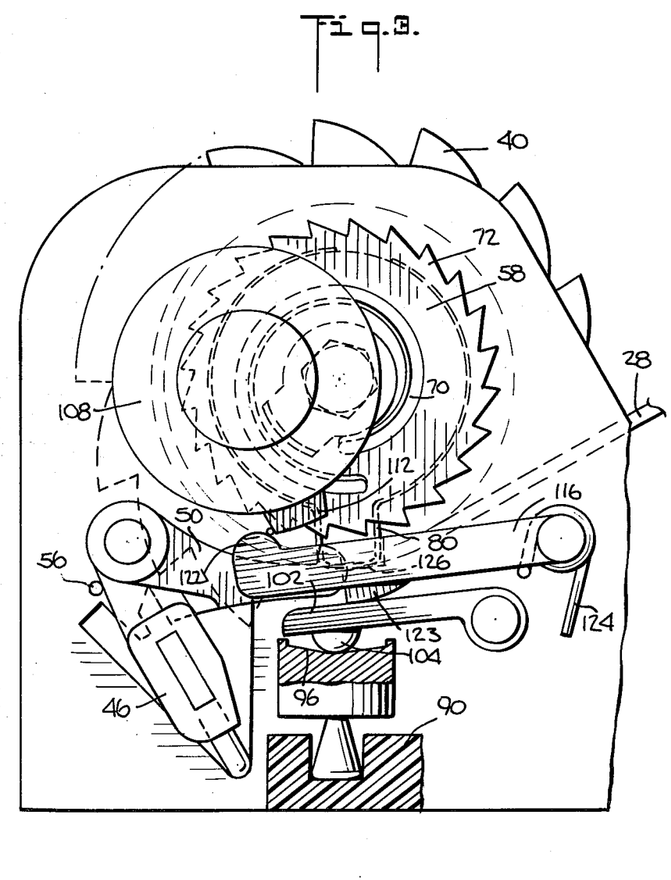
FIG. 3 is a view similar to FIG. 2 illustrating the position of the operative elements upon initial protraction of the safety belt.

FIG. 3 illustrates the position of the various elements of locking device 10 upon initial protraction of the safety belt. Thus, protraction of safety belt 28 serves to rotate shaft 14 counterclockwise which, in turn, effects similar rotation of cam wheel 108 by means of interconnecting gear 58. Counterclockwise rotation of cam wheel 108 serves to locate cam lobe 112 in disengagement with cam follower contact 122 and also serves to rotate slip ring 76 counterclockwise until projecting lug 80 engages cam follower recess portion 126. It will be appreciated that projecting lug 80 engages said recess portion 126 before cam lobe 112 disengages from cam follower contact 122. Accordingly, slip ring 78 serves to maintain cam follower 116 in its displaced position during initial protraction of the belt to prevent movement of inertial mass 84 to its second position. It is again noted that locking device 10 is rendered inoperative regardless of whether the vehicle is parked on a steep incline or is undergoing changes in vehicle velocity.

Figure 4:
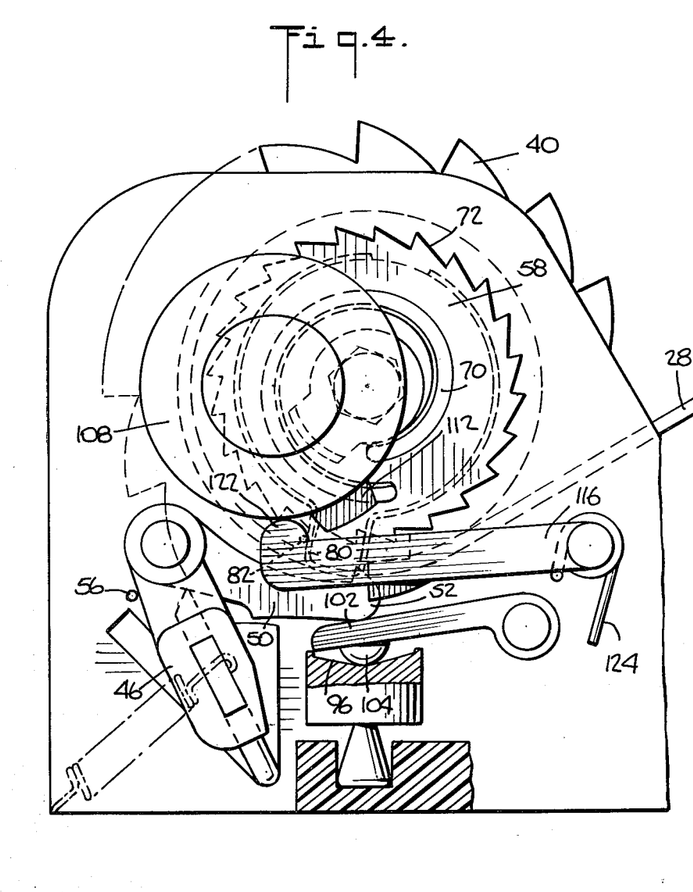
FIG. 4 is a view similar to FIG. 2 illustrating the position of the operative elements after the safety belt has been initially protracted and fastened around the passenger and retracted slightly to fit snugly against the passenger.

FIG. 4 illustrates the position of the various elements of locking device 10 when the safety belt has been protracted and buckled around the passenger, and then retracted slightly under influence of retractor spring 34 to fit snugly against the passenger. Such light retraction serves to rotate shaft 14 clockwise which, in turn, serves to similarly rotate slip ring 78, thereby causing projecting lug 80 to disengage from cam follower recess portion 126 and abut against stop pin 82. Cam follower 116 is now free to rotate clockwise, under influence of spring 124, until contact surface 122 engages the circumferential edge of cam wheel 108. Such rotation of cam follower 116 permits lever 102 to move to a position responsive to the position of inertial mass 84. In the position illustrated, inertial mass 84 is in its heretofore designated first position wherein latch 50 is spaced from gear 58 and pawl 42 is spaced from ratchet 40, which positions represent the heretofore designated inoperable positions of said elements. Safety belt 28 may now be freely protracted and/or retracted during the entire period that the vehicle undergoes changes in the velocity less than a predetermined amount whereby the passenger is thus afforded freedom of movement without having to unbuckle the belt and completely retract the same.

Figure 5:
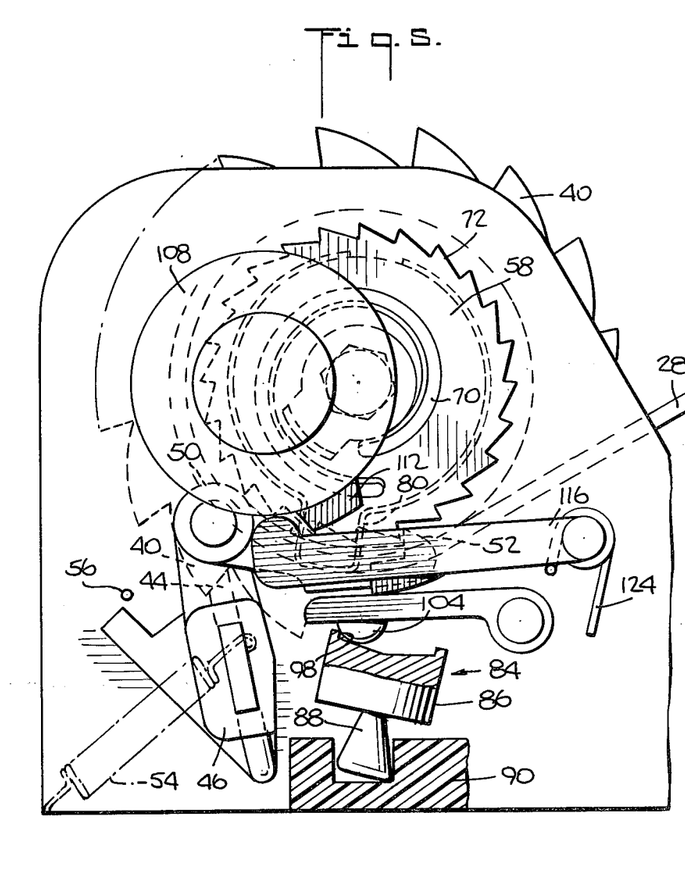
FIG. 5 is a view similar to FIG. 2 illustrating the position of the operative elements after the vehicle has undergone a velocity change in excess of a predetermined dangerous amount and a protraction force has been applied to the safety belt.
Figure 6:
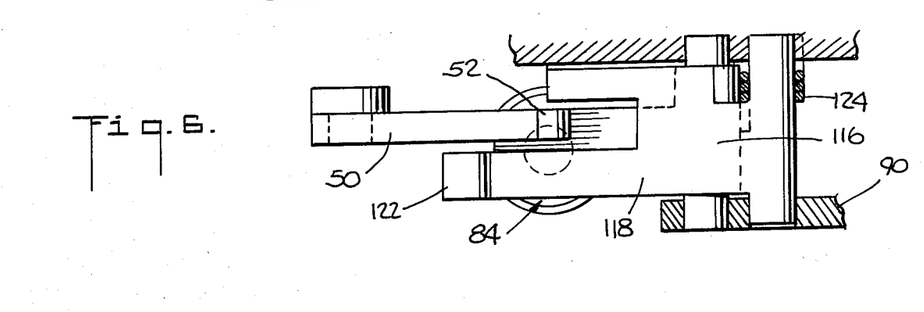
FIG. 6 is a sectional view taken along line 6—6 of FIG. 2.

FIG. 5 illustrates the position of the elements of locking device 10 at such time when the vehicle velocity has changed by an amount greater than the predetermined dangerous amount, and the passenger has applied a force against safety belt 28 sufficient to tend to protract the belt. For example, if the vehicle is involved in a collision while moving forwardly, the vehicle will decelerate and the passenger will tend to move forwardly, thereby applying a protraction force on the safety belt.

Immediately prior to the collision, the locking device elements are in the position illustrated in FIG. 4. At the moment of collision, the elements move to the respective positions illustrated in FIG. 5 wherein inertial mass 84 is caused to pivot to its heretofore designated second position. Such movement displaces lever 102 upwardly which, in turn, displaces latch projection 52 into the path of movement of gear 58. The passenger, whose body is thrown against the safety belt 28, causes a slight protraction of the safety belt which causes shaft 14 to rotate counterclockwise. Such rotation similarly effects counterclockwise rotation of gear 58 which serves to engage latch projection 52 with one of the gear teeth projections 72 to displace latch 50 to its operate position. This, in turn, serves to displace pawl 42 to its operate position wherein said pawl engages ratchet 40 to prevent further protraction of safety belt 28 to thereby restrain the passenger in his seat.

Upon completion of the rapid velocity change, such as when the vehicle is brought to a sudden stop and the passenger relaxes in his seat, the safety belt is then retracted under influence of retractor spring 34 to fit snugly around the passenger. Inertial mass 84 also pivots back to its heretofore designated first position wherein lever 102 is displaced downwardly permitting latch 50 to pawl 42 to pivot back to their respective inoperable positions. The elements are now reset to the respective positions illustrated in FIG. 4.

Referring to FIG. 5, it is noted that contact element 104 slidably engages the bottom recess wall 96 of inertial mass 84 and rides along said wall until it bears against shoulder 98 to prevent the mass from pivoting beyond its heretofore designated second position. The structure is such that the outer wall surfaces of mass post portion 88 are spaced from the inner wall surfaces of bracket opening 100 during operation of the device to avoid any unnecessary restraint on pivotal movement of inertial mass 84, and wherein the interengagement of lever 104 with shoulder 98 also functions to prevent the outer wall of post 88 from contacting the inner wall of bracket opening 100.

The interengagement of inertial mass 84 with lever 102 may also be defined in terms of the camming action between said elements. Thus, circular recess 94 is a camming surface on which rides lever 102 which acts as a cam follower. The construction is such that horizontal displacement of the camming surface causes vertical displacement of the cam follower. In operation, the mass side walls 98 define a restraining lip wherein the cam follower engages with said lip upon pivotal movement of the mass a predetermined amount to prevent further pivotal movement of the mass.

From the foregoing, it can be seen that the safety belt retractor locking device of this invention provides the convenience of permitting continual protraction and retraction during the entire period when the vehicle is not undergoing a velocity change in excess of a predetermined dangerous amount, and yet effectively prevents protraction of the belt during a velocity change in excess of the predetermined amount. The device can be manufactured and installed inexpensively and is adapted to be used with conventional retractor mechanisms. The device further includes restraining means operative to prevent actuation of the locking device upon initial protraction and full retraction of the belt regardless of whether the vehicle is parked on a steep incline or is undergoing changes in vehicle velocity.

While a preferred embodiment of the invention has been shown and described in detail, it will be readily understood and appreciated that numerous omissions, changes and additions may be made without departing from the spirit and scope of the present invention. Thus, for example, it is within the purview of the present invention to alter the taper of post portion 88 relative to bracket opening 100, whereby said post portion may be formed having a cylindrical shape and the interior wall surfaces of frame opening 100 would then taper upwardly and in diverging relation toward the open end thereof. The cooperative result or effect is the same since inertial mass 84 is still capable of pivoting to its second position in which the outer wall surfaces of post portion 88 are prevented from contacting the inner wall surfaces of frame opening 100 by means of the interengagement of lever contact 104 with the mass shoulder portion 98. Furthermore, the shape of enlarged mass portion 86 is not limited to the generally cylindrical shape illustrated in the drawings, and may be constructed having tapered walls similar to that provided for post portion 88.

It should be further noted that restraining means 106 may be operable without displaced cam follower 116 actually being in contact with lever 102 when initial mass 84 is in its first position. In this instance, contact of cam follower 116 with lever 102 will then occur when mass 84 moves slightly toward its second position. Such movement of the mass will be limited by the presence of displaced cam follower 116 whereby the limited movement of said mass is insufficient to permit engagement of the locking mechanism when the restraining means is operative.

We claim:
1. A safety belt retractor locking device comprising:
 a. a frame;
 b. a shaft rotatably mounted on the frame;
 c. a belt attached to the shaft for protraction and retraction with respect thereto;
 d. means for rotating the shaft to retract the belt;
 e. a ratchet wheel mounted on the shaft for rotation therewith;
 f. a pawl pivotally mounted on the frame for movement from an inoperable position wherein said pawl is spaced from the ratchet to an operate position wherein said pawl engages the ratchet to prevent protraction of the belt;
 g. a gear mounted on the shaft for rotation therewith;
 h. a latch pivotally mounted on the pawl for movement from an inoperable position wherein said latch is spaced from the gear to an operate position wherein said latch engages the gear for movement therewith to displace said pawl to its operate position;
 i. an inertial mass mounted on said frame and responsive to a change in vehicle velocity, said mass disposed for movement between a first position wherein the velocity change is below a predetermined magnitude and a second position wherein the velocity change is greater than said predetermined magnitude;

j. a lever pivotally mounted on the frame in engagement with the mass and displaced for movement responsive to the position of the mass;

k. said lever further being in engagement with the latch such that when the mass is in its second position the latch is displaced by the lever to its operate position to prevent further protraction of the belt; and l. restraining means mounted on the frame responsive to protraction and retraction of the belt, said restraining means being operative to prevent movement of the mass to its second position upon initial protraction and full retraction of said belt.

2. The safety belt retractor locking device as recited in claim 1, wherein said restraining means comprises a cam wheel rotatably mounted on the frame and a cam follower pivotally mounted on said frame in engagement with the wheel; said wheel being operatively driven by said gear.

3. The safety belt retractor locking device as recited in claim 2, wherein said cam wheel includes a lobe portion projecting radially outwardly beyond the edge of the wheel; bias means urging the cam follower into riding contact with the edge of said wheel; said follower engaging said lobe and being displaced toward the mass to prevent movement of said mass to its second position upon full retraction of the belt.

4. The safety belt retractor locking device as recited in claim 3, wherein said lever is located between the cam follower and the inertial mass; said displaced follower engaging the lever to prevent movement thereof upon full retraction of the belt.

5. The safety belt retractor locking device as recited in claim 3, wherein said cam wheel further includes a plurality of circumferentially spaced lugs projecting outwardly normal to the plane of the wheel; said gear including a raised helical projection received between a pair of the spaced lugs and rotatably engageable with said lugs to drive the wheel upon protraction and retraction of the belt.

6. The safety belt retractor locking device as recited in claim 3, wherein said lever is located between the cam follower and the inertial mass; said displaced follower engaging the lever to prevent movement thereof upon initial protraction of the belt.

7. The safety belt retractor locking device as recited in claim 3, wherein said restraining means further comprises clutch means operatively connected to the shaft for partial rotation therewith; said clutch means engaging the cam follower for maintaining said follower in its displaced position upon initial protraction of the belt.

8. The safety belt retractor locking device as recited in claim 7, wherein said clutch means comprises a slip ring rotatably connected to the shaft; said ring having a projecting lug engaging a surface portion of the displaced follower upon initial protraction of said belt.

9. The safety belt retractor locking device as recited in claim 8, wherein said slip ring is rotatably mounted on the gear for partial rotation therewith.

10. The safety belt retractor locking device as recited in claim 1, wherein said gear further includes a plurality of teeth projections; said latch in its operate position engageable with one of said teeth to displace the pawl to its operate position when the mass is in its second position.

11. The safety belt retractor locking device as recited in claim 1, further comprising bias means for urging the pawl to its inoperable position.

12. The safety belt retractor locking device as recited in claim 1, wherein said mass is formed having a generally circular recess including a bottom wall tapering radially outwardly and upwardly from the center thereof; said lever including a contact element receivable in said recess.

13. The safety belt retractor locking device as recited in claim 12, wherein said lever contact element is formed having a rounded surface slideably engaging the bottom wall of the recess upon movement of the mass.

14. The safety belt retractor locking device as recited in claim 13, wherein said recess includes side walls defining a shoulder to retain the lever contact element within said recess during movement of the mass.

15. The safety belt retractor locking device as recited in claim 1, wherein said mass includes a post portion; said frame having an opening for receiving said post.

16. The safety belt retractor locking device as recited in claim 15, wherein said frame includes interior wall surfaces defining the opening and said post is formed having outer wall surfaces; at least one of said interior and outer wall surfaces being tapered to permit the mass to pivot relative to the frame.

17. The safety belt retractor locking device as recited in claim 16, wherein said mass further includes an enlarged upper portion; said post depending from the upper portion of said mass; and the outer walls of said post tapering inwardly toward the enlarged portion of the mass.

18. The safety belt retractor locking device as recited in claim 1, wherein said mass is formed having a generally circular recess including a bottom wall tapering radially outwardly and upwardly from the center thereof, and side walls defining a shoulder; said lever including a contact element having a rounded surface slideably engaging the bottom wall of the recess; said mass including a post portion formed having outer wall surfaces; said frame including interior wall surfaces defining an opening for receiving the post; at least one of said interior and outer wall surfaces being tapered to permit the mass to pivot relative to the frame; said lever contact element engaging the shoulder of the recess upon movement of the mass to its second position to limit further pivotal movement of said mass and prevent the outer wall surfaces of the post from contacting the interior wall surfaces of the frame opening.

19. In a safety belt retractor locking device having an inertial mass disposed for movement responsive to changes in velocity, the improvement comprising:

a. a support;

b. said mass being pivotally mounted on said support and having a head portion and a post portion, said post portion extending downwardly from said head portion and having an outer wall surface;

c. said support having an interior wall surface defining an opening for receiving the post portion;

d. said head portion having a camming surface;

e. said camming surface having a restraining lip at its outer periphery;

f. a cam follower resting on said camming surface wherein pivotal movement of said mass causes displacement of said cam follower;

g. said cam follower engaging said restraining lip upon pivotal movement of said mass a predetermined amount preventing further pivotal movement of said mass; and h. the outer wall surface of the post portion being spaced from the inner wall surface of the support opening during pivotal movement of the mass to the position where the cam follower engages with the restraining lip.

20. The improvement of claim 19, wherein the interior wall of the support opening is substantially cylindrical, and the outer wall of the post portion is substantially conical having its greatest diameter at the bottom of said post and its smallest diameter adjacent the head portion of the mass.

\* \* \* \* \*